(12) United States Patent
McCormick et al.

(10) Patent No.: US 9,091,792 B2
(45) Date of Patent: Jul. 28, 2015

(54) SOUNDING KIT

(75) Inventors: Berry Lee McCormick, Carriere, MS (US); Richard Harvey Smith, Picayune, MS (US); Emery William Hughes, III, Mandeville, LA (US); Michael Thomas Dewenter, New Orleans, LA (US)

(73) Assignee: Foster-Miller, Inc., Waltham, MA (US)

( * ) Notice: Subject to any disclaimer, the term of this patent is extended or adjusted under 35 U.S.C. 154(b) by 388 days.

(21) Appl. No.: 13/596,663

(22) Filed: Aug. 28, 2012

(65) Prior Publication Data
US 2014/0060174 A1 Mar. 6, 2014

(51) Int. Cl.
*G01W 1/00* (2006.01)
*G01W 1/08* (2006.01)

(52) U.S. Cl.
CPC ........................................ *G01W 1/08* (2013.01)

(58) Field of Classification Search
None
See application file for complete search history.

(56) References Cited

U.S. PATENT DOCUMENTS

| | | | |
|---|---|---|---|
| 2,347,160 A | | 4/1944 | Wallace |
| 4,494,714 A | | 1/1985 | Hill et al. |
| 5,485,747 A | * | 1/1996 | Antikainen et al. ........ 73/335.03 |
| 5,548,283 A | * | 8/1996 | Martin ...................... 340/870.01 |
| 5,636,480 A | * | 6/1997 | Lauritsen et al. ................... 52/66 |
| 5,646,343 A | * | 7/1997 | Pritchard .................... 73/170.08 |
| 5,850,987 A | * | 12/1998 | Aurilio et al. ............... 244/1 TD |
| 6,421,010 B1 | | 7/2002 | Chadwick et al. |
| 6,628,941 B2 | * | 9/2003 | Knoblach et al. ............. 455/431 |
| 7,356,390 B2 | * | 4/2008 | Knoblach et al. .................. 701/4 |
| 7,358,862 B2 | * | 4/2008 | Andersson et al. ......... 340/870.1 |
| 7,365,674 B2 | * | 4/2008 | Tillotson et al. ............. 342/26 B |
| 7,509,838 B2 | * | 3/2009 | Paukkunen ................... 73/29.01 |
| 8,345,115 B2 | * | 1/2013 | Tillotson ..................... 348/222.1 |
| 2007/0272801 A1 | * | 11/2007 | Hilliard et al. ................ 244/142 |

FOREIGN PATENT DOCUMENTS

CA 1 271 460 7/1990

OTHER PUBLICATIONS

Rodney D.Weirenga, Joe Parini, Intermet 403 MHX Radiosonde System, four (4) pages, International Met Systems, Grand Rapids, Michigan.
Written Opinion of the International Searching Authority for PCT Application No. PCT/US2013/55095 mailed Jan. 22, 2014 (six (6) pages).
InterMet (International Met Systems), Draft, User's Manual for the IMet-3150 403 MHz GPS Upper-Air Sounding System, Document No. 200,741, Nov. 2, 2010, Revision 10, 123 pages.
Graw Radiosondes, Upper Air Sounding Systems, Sounding the Future, GRAW Radiosondes GmbH & Co. KG, Muggenhofer Str. 95, 90429 Nuremberg, Germany, 2010, 9 pages.

* cited by examiner

*Primary Examiner* — Peter Macchiarolo
*Assistant Examiner* — Jermaine Jenkins
(74) *Attorney, Agent, or Firm* — Iandiorio Teska & Coleman, LLP (57) ABSTRACT

A man packable, portable sounding kit includes, in one example, at least two balloons and at least two radiosondes each including a tether for connecting a radiosonde to a balloon. A gas container includes gas for inflating the at least two balloons. A fill hose assembly includes a balloon inflation nozzle coupled to a pressure regulator. A data transceiver unit is configured to receive and optionally to rebroadcast atmospheric weather data from the radiosonde. A case houses the balloons, radiosondes, data transceiver unit, gas container, and fill hose assembly.

14 Claims, 11 Drawing Sheets

SOUNDING KIT

FIELD OF THE INVENTION

The invention relates to radiosondes and sounding stations and equipment.

BACKGROUND OF THE INVENTION

Sounding stations launch a radiosonde—atmospheric measurement devices and sensors coupled to a transmitter tethered to a balloon. Sounding stations are typically large, complex, and expensive systems.

There are instances when weather data is needed in the field. Examples include deployments and/or operation in areas not served by regular weather reports derived by government controlled sounding stations, (e.g., NOAA). Another example is when precise weather conditions are needed between regularly scheduled radiosonde launches.

So called "portable" sounding systems require a trailer to transport them, include a large antenna on a tripod, and/or are expensive, complex, and bulky.

SUMMARY OF THE INVENTION

In one aspect, the invention provides a small, packable, portable sounding system easily carried, easily deployed, and easy to use in order to provide real time weather data for weather dependent missions such as artillery support, aerial delivery, and the like.

Featured is a man packable, portable sounding kit comprising one or more balloons, a radiosonde attachable to a said balloon, and a data transceiver unit configured to receive atmospheric weather data from the radiosonde and also interfaceable with a computing device configured to utilize the weather data. A gas container configured for filling the balloon is provided as a part of the kit in one preferred example.

In one example, a fill hose assembly interconnects the gas container with a balloon. The fill hose assembly may include a balloon inflation nozzle coupled to a pressure regulator. The pressure regulator may include a regulator valve. In one version, the fill hose assembly includes a balloon fill valve adjacent the balloon inflation nozzle. One preferred balloon inflation nozzle includes spaced ribs. Also, the gas container may include a pressure indicator.

In one preferred embodiment, the components of the kit in total weigh less than 4 kgs. There may be two balloons and each balloon is typically less than 100 grams. The gas container typically has a volume of less than or equal to two liters.

The sounding kit may further include a case housing the balloons, the radiosonde, the data transceiver unit, and the gas container. In one example, each balloon is packaged with a radiosonde in a sleeve. Further included is a tether connecting the radiosonde to the balloon. The tether may include a balloon sealer. Further included may be ground station software loadable on the computing device and configured to interpret and display weather data.

Also featured is a sounding system comprising at least two balloons and at least two radiosondes each including a tether for connecting a radiosonde to a balloon. A gas container including gas sufficient for inflating the two balloons. A fill hose assembly includes a balloon inflation nozzle coupled to a pressure regulator. A data transceiver unit is configured to receive atmospheric weather data from the radiosonde. A case houses the balloons, radiosondes, data transceiver unit, gas container, and fill hose assembly.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
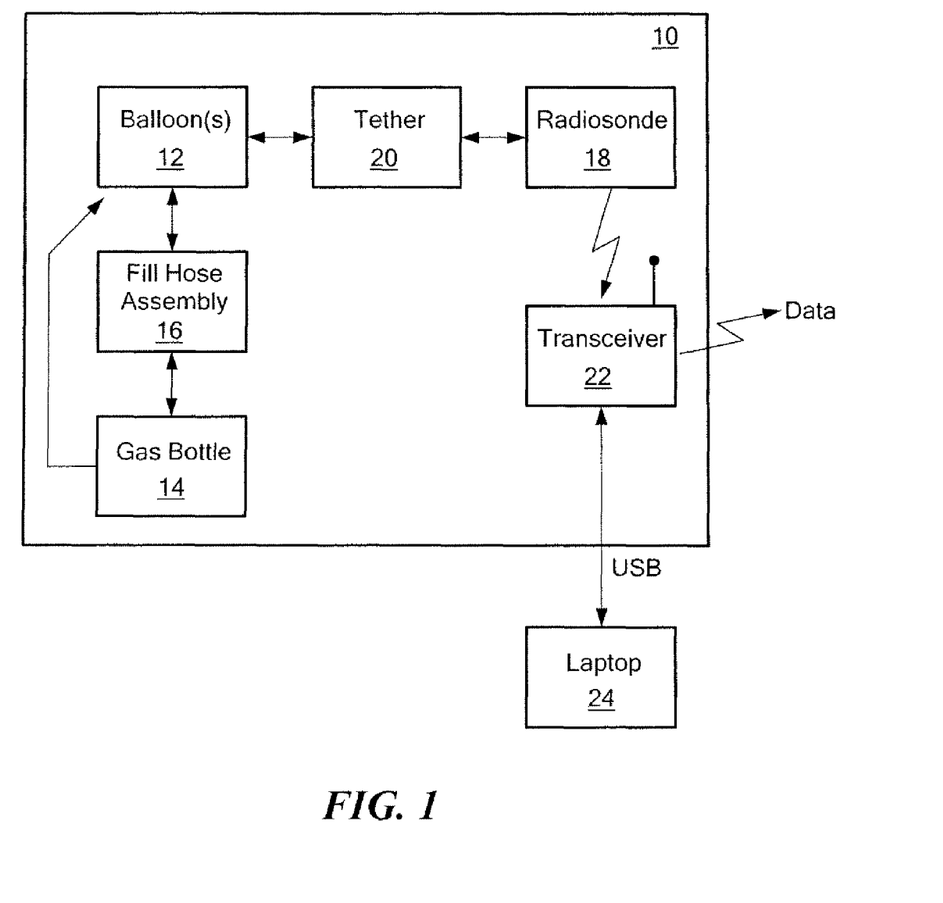
FIG. 1 is a block diagram showing several of the primary components associated with a sounding kit in accordance with the invention.
Figure 2:
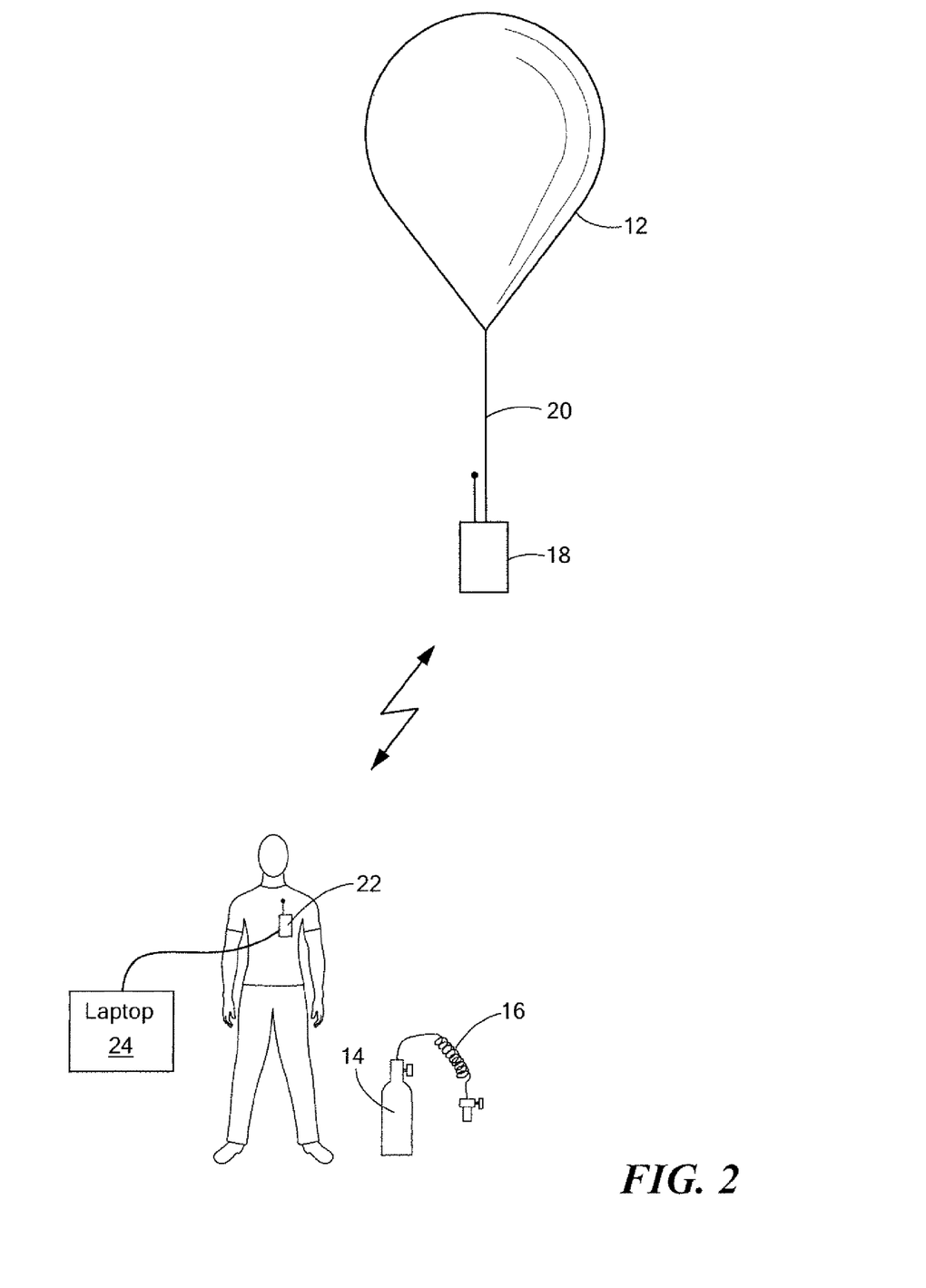
FIG. 2 is a schematic view showing the launch of a radiosonde in accordance with an example of the invention.

FIG. 1 depicts an example of a man packable, portable sounding kit 10 with one or more balloons 12 (e.g., 30 gram balloons) filled by helium bottle 12 via fill hose assembly 16. The balloons are typically less than 100 grams. Radiosonde 18 is attached to a balloon 12 via tether 20. Radiosonde 18 includes means for sensing, for example, atmospheric pressure, air temperature, relative humidity, wind speed, wind direction, and the like as the balloon ascends as shown in FIG. 2. This weather data is transmitted from radiosonde 18 to wearable transceiver 22 which can be connected to laptop 24 via a USB cable or other interface. Laptop 24 may operate software which interprets the raw weather data from the radiosonde and displays the weather data on the laptop. Alternatively or in addition, data from radiosonde 18 can be rebroadcasted by transceiver 22 wirelessly to an aircraft, for example, which uses the data in planning and performing airdrop operations.

One preferred system continuously measures wind speed, wind direction, pressure, temperature, and humidity while ascending through the air column on a six cubic foot weather balloon about 32 inches in diameter. Helium tank 14 has a capacity for two deployments.

Forward deployed units or squads can report real-time weather conditions either by voice or net-centric data transmission to any user requiring the information. The data from the radiosonde can be imported into standard weather forecasting software to produce tactical weather reports. The complete kit preferably weighs less than 4 kg. In one example, it weighed less than 2 kg. Radiosonde 18 weights 38.3 g and is 12.3×37.9×34.7 cm. Transceiver 22 weights 112 g and is 9.5×4.3×1.9 cm. Helium bottle 12 weighs 1.7 kg (empty) and has a volume of 1.15 L at 4,500 psi. It is 34.3 cm tall×11 cm in diameter. Fill hose assembly 16 is 82.5 cm in length.

Figure 3:
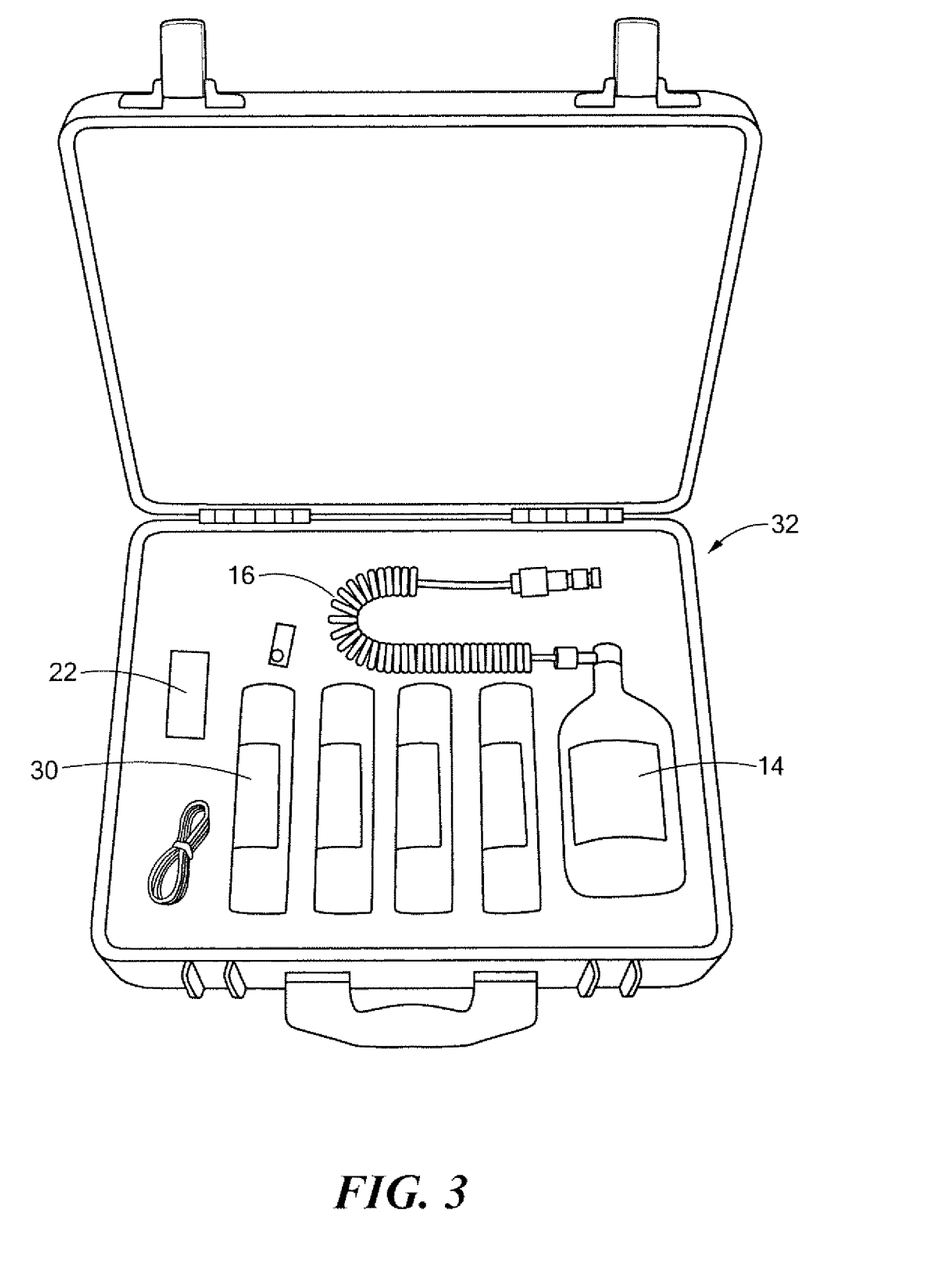
FIG. 3 is a schematic three dimensional top view showing one embodiment of a tactical weather observer kit featured via the invention.

FIG. 3 shows an example where four radiosonde/balloon combinations are packaged in sleeves 30 and transported along with transceiver 22, helium bottle 14, and fill hose assembly 16 in high impact case 32.

Figure 4:
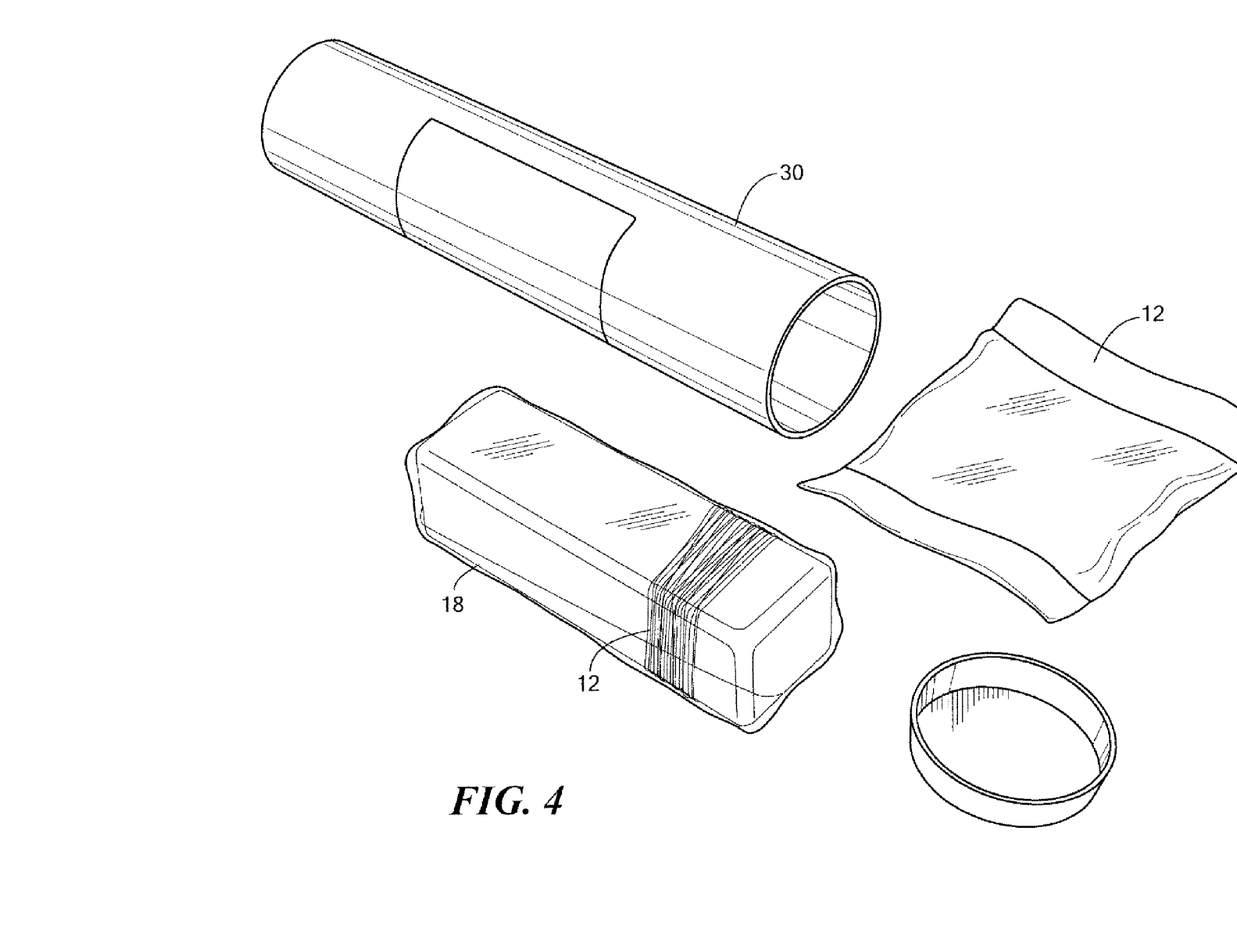
FIG. 4 is a schematic view showing an unpackaged balloon and radiosonde from the kit of FIG. 3.

FIG. 4 shows radiosonde 18 in protective shrink wrap as well as tether 20 wrapped about the radiosonde body. Balloon 12 is in a plastic bag.

Figure 5:
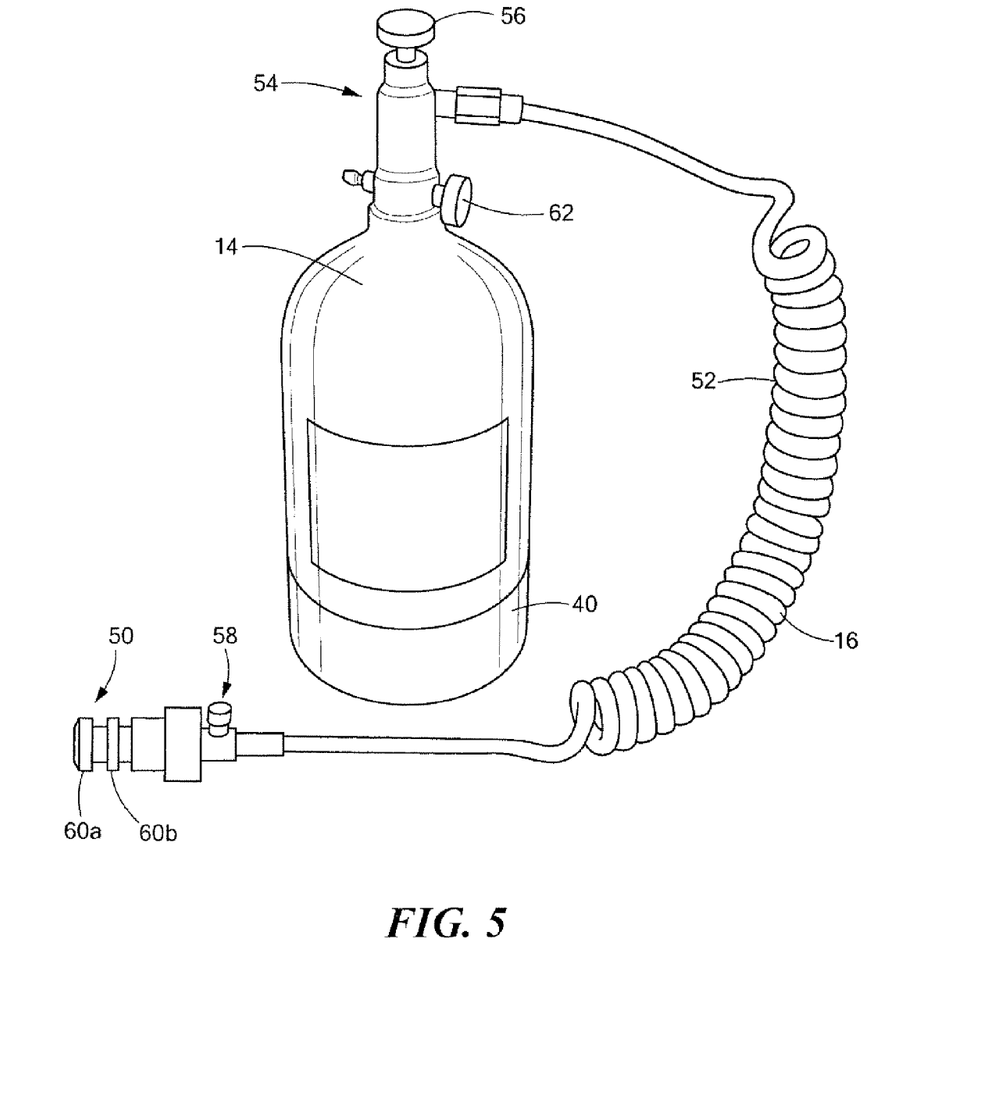
FIG. 5 is a schematic view showing an example of the high pressure helium bottle and fill hose assembly from the kit of FIG. 3.

Helium bottle 14 may include bottle stand 40. Fill hose assembly 16 includes balloon inflation nozzle 50 coupled via coiled filling hose 52 to pressure regulator 54. Pressure regulator 54 includes regulator valve 56 and the fill hose assembly includes balloon fill valve 58 adjacent nozzle 50. One preferred inflation nozzle includes spaced ribs 60a and 60b. Also, bottle 14 includes pressure indicator 62.

Figure 6:
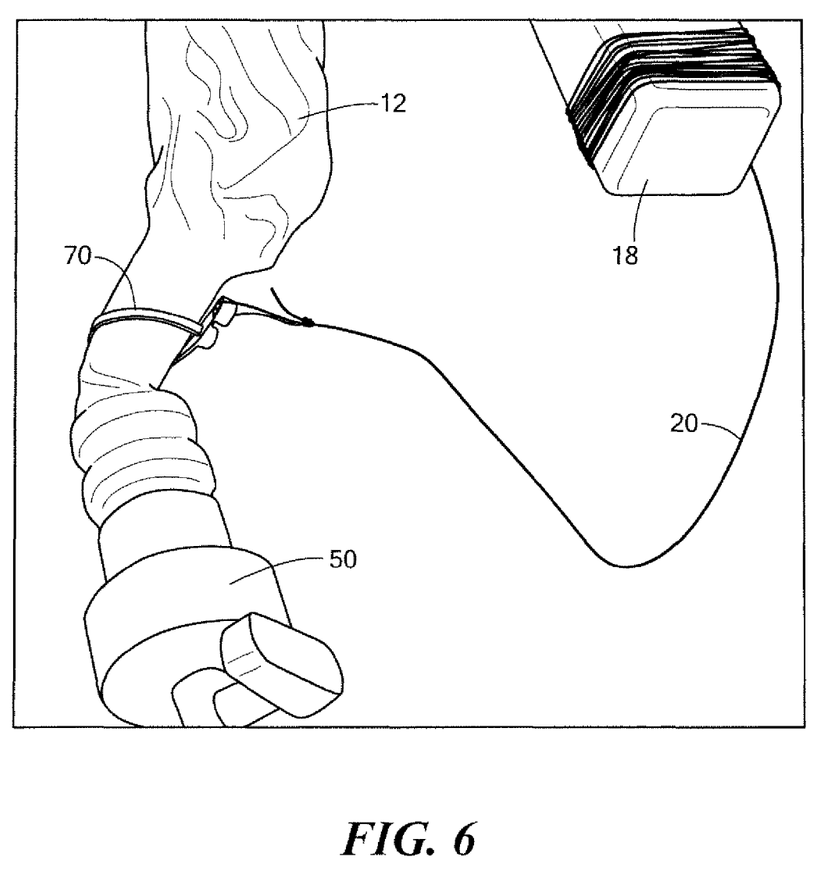
FIG. 6 is a schematic view showing a weather balloon being attached to the fill hose assembly fill nozzle.

Helium tank 14 is attached to fill hose assembly 16 and the pressure indicator 62 is checked to ensure helium tank 14 has sufficient pressure to launch a radiosonde. Radiosonde 18 is then prepared as shown in FIG. 6 and the neck of a balloon 12 is pulled over the ribs of inflation nozzle 50. A balloon sealer such as zip tie 70 is attached to radiosonde tether 20 and at this stage is loosely fastened about the neck of the balloon as shown in FIG. 6. Next, main pressure regulator valve 56, FIG. 5 is turned clockwise and balloon fill valve 58 is turned clockwise to inflate the balloon to approximately 2.25 kpsi. Then regulator valve 56 and balloon fill valve 58 are closed. Zip tie 70, FIG. 6 is then tightened and the neck of the balloon can be removed from the fill nozzle.

Figure 7:
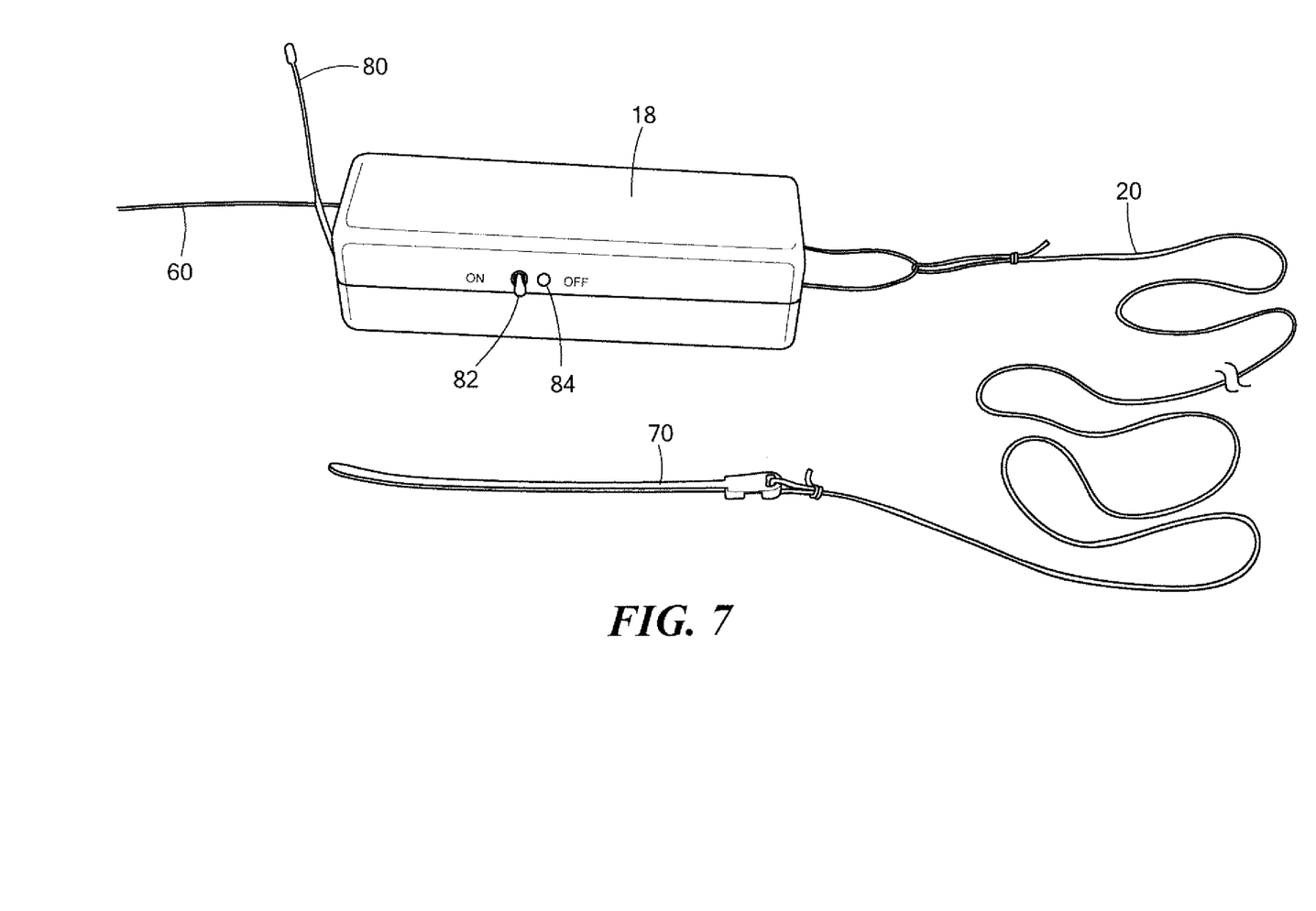
FIG. 7 is a schematic three dimensional side view of the radiosonde of the kit of FIG. 3 coupled to a balloon tether and balloon sealer.

Temperature/humidity sensor 80, FIG. 7 of radiosonde 18 is then bent at a right angle with respect to the radiosonde and on/off switch 82 is turned on. Once the radiosonde GPS has a valid fix, LED status light 84 starts blinking green. Thereafter the balloon can be deployed slowly drawing off the tether string coiled around the radiosonde after which the radiosonde can be left go.

Figure 8:
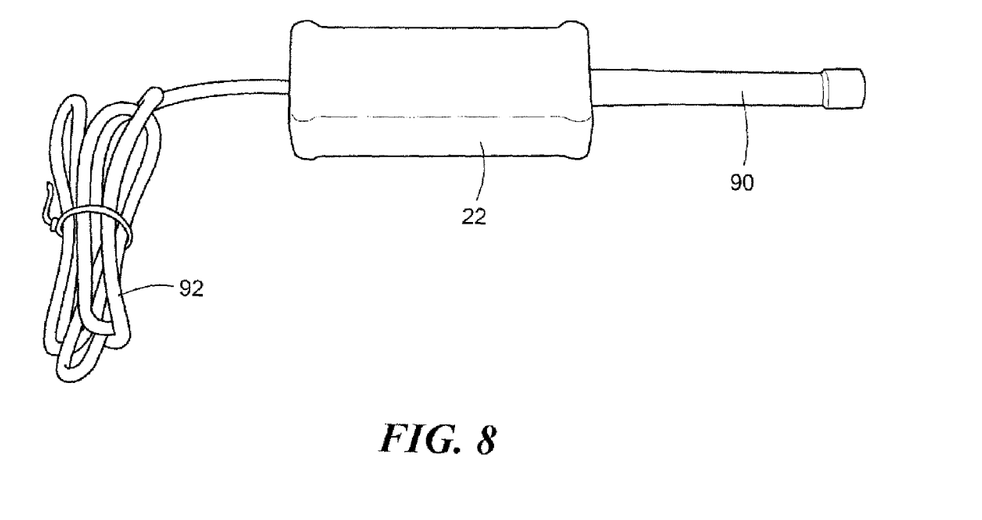
FIG. 8 is a schematic three dimension top view of the transceiver of the kit of FIG. 3.

FIG. 8 shows transceiver 22 which receives weather data from the radiosonde and including 400 MHz antenna 90 and USB cable 92.

Figure 9:
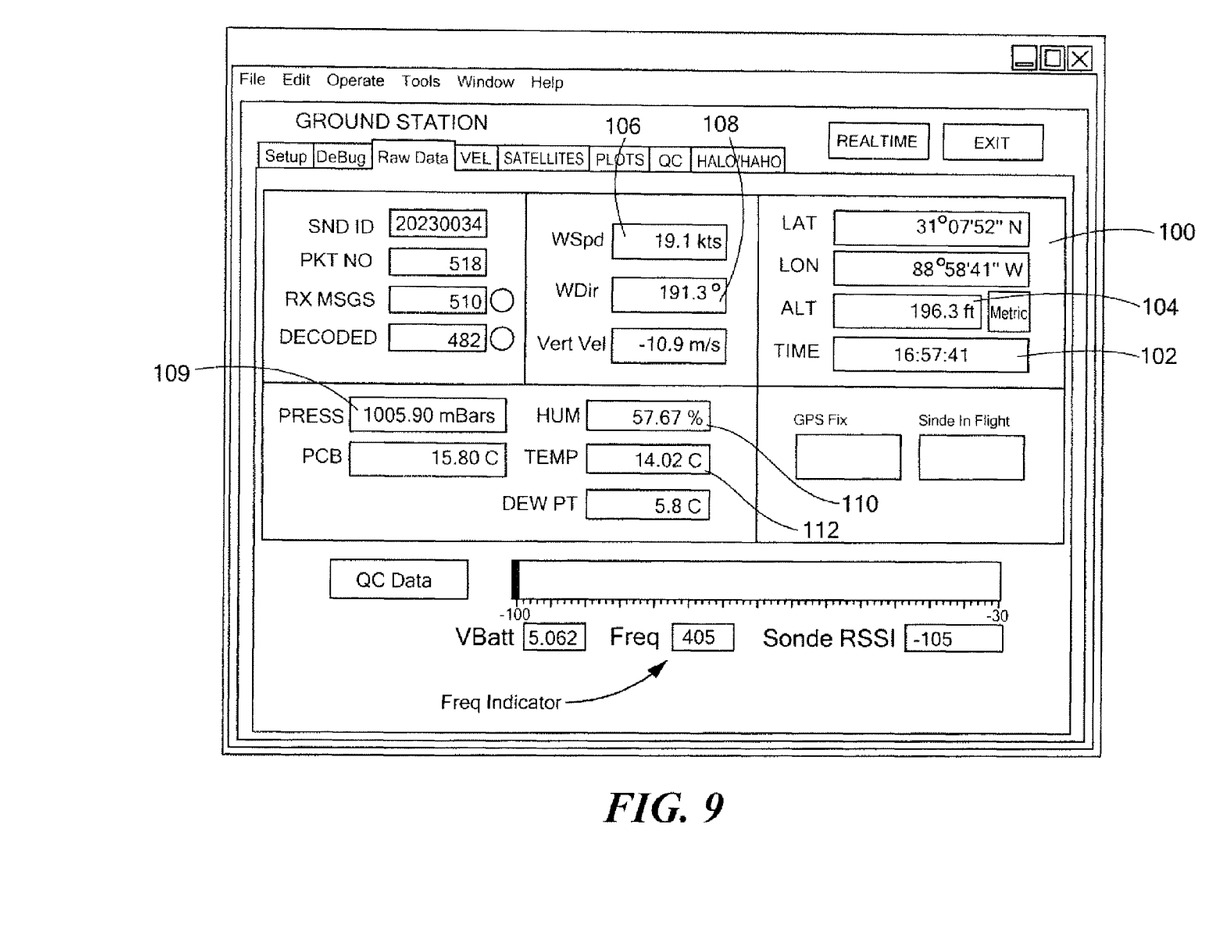
FIG. 9 is a screen shot showing the operation of software loaded onto the laptop computer of FIG. 1 which interprets and displays weather data for the user when transmitted to the laptop from the transceiver of FIG. 1.

FIG. 9 shows how data such as positional data of the radiosonde at 100, the time 102, the altitude 104, wind speed and direction 106 and 108, respectively, atmospheric pressure 109, humidity 110, and temperature 112 are displayed on the screen of laptop 24, FIG. 1.

Figure 10:
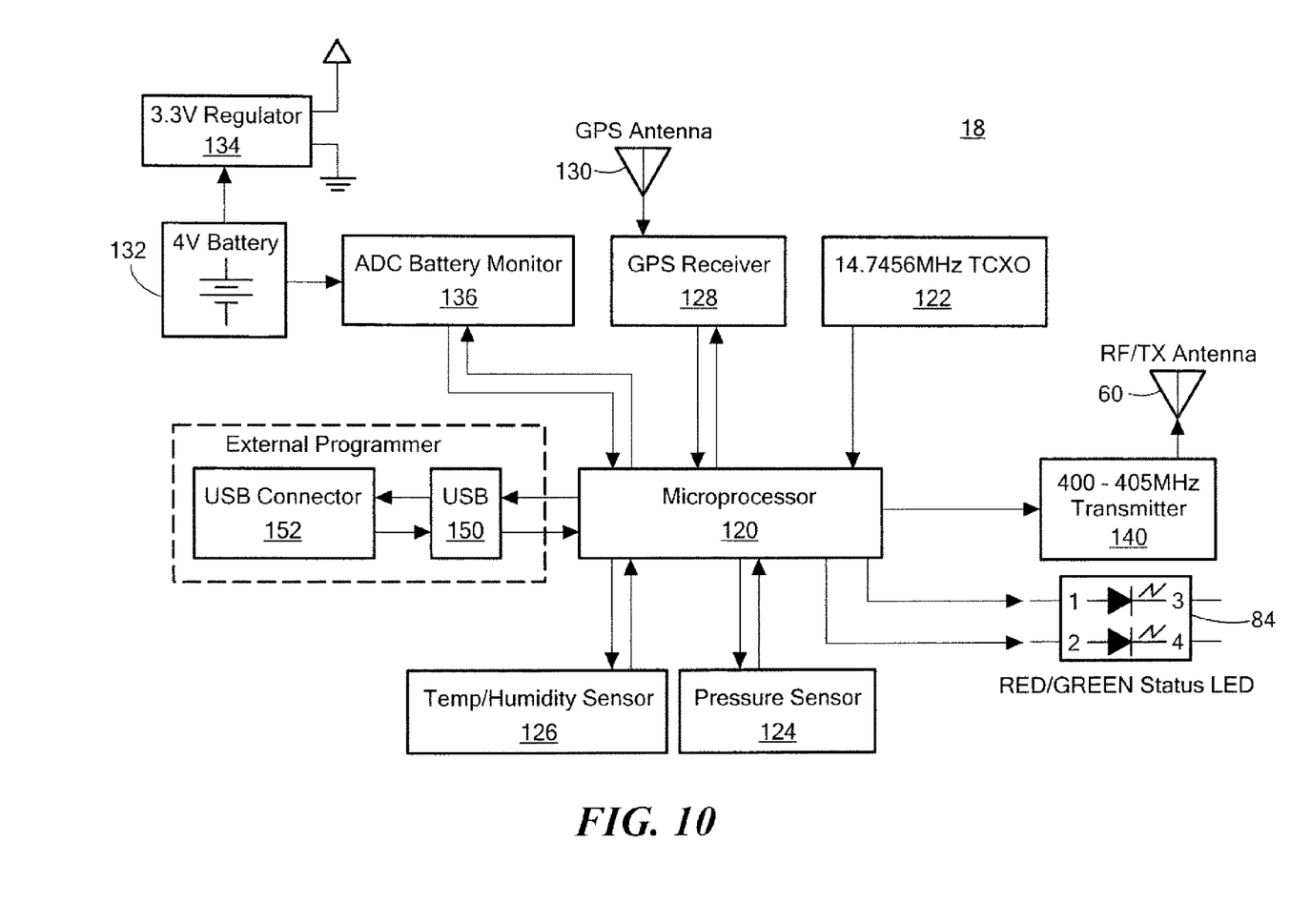
FIG. 10 is a block diagram showing, in one example, the primary components associated with a radiosonde in accordance with the invention.

The primary components of the preferred radiosonde 18, FIG. 10 include microprocessor 120 interfacing with 14.7456 MHz oscillator 122. Microprocessor 120 receives data from pressure sensor 124 and temperature and humidity sensor 126 and location information from GPS receiver 128 which includes GPS antenna 130. Microprocessor 120 is powered by 4V battery 132 via regulator 134. ADC battery monitor 136 is also provided. Microprocessor 120 controls transmitter 140 to transmit temperature data and humidity sensor and pressure sensor data as well as GPS data via antenna 60. Transmitter 140 typically operates in the range of 400-405 MHz. Access to microprocessor 120 includes USB interface 150 and USB connector 152. See also U.S. Pat. Nos. 7,358,862 and 6,421,010 incorporated herein by this reference.

Figure 11:
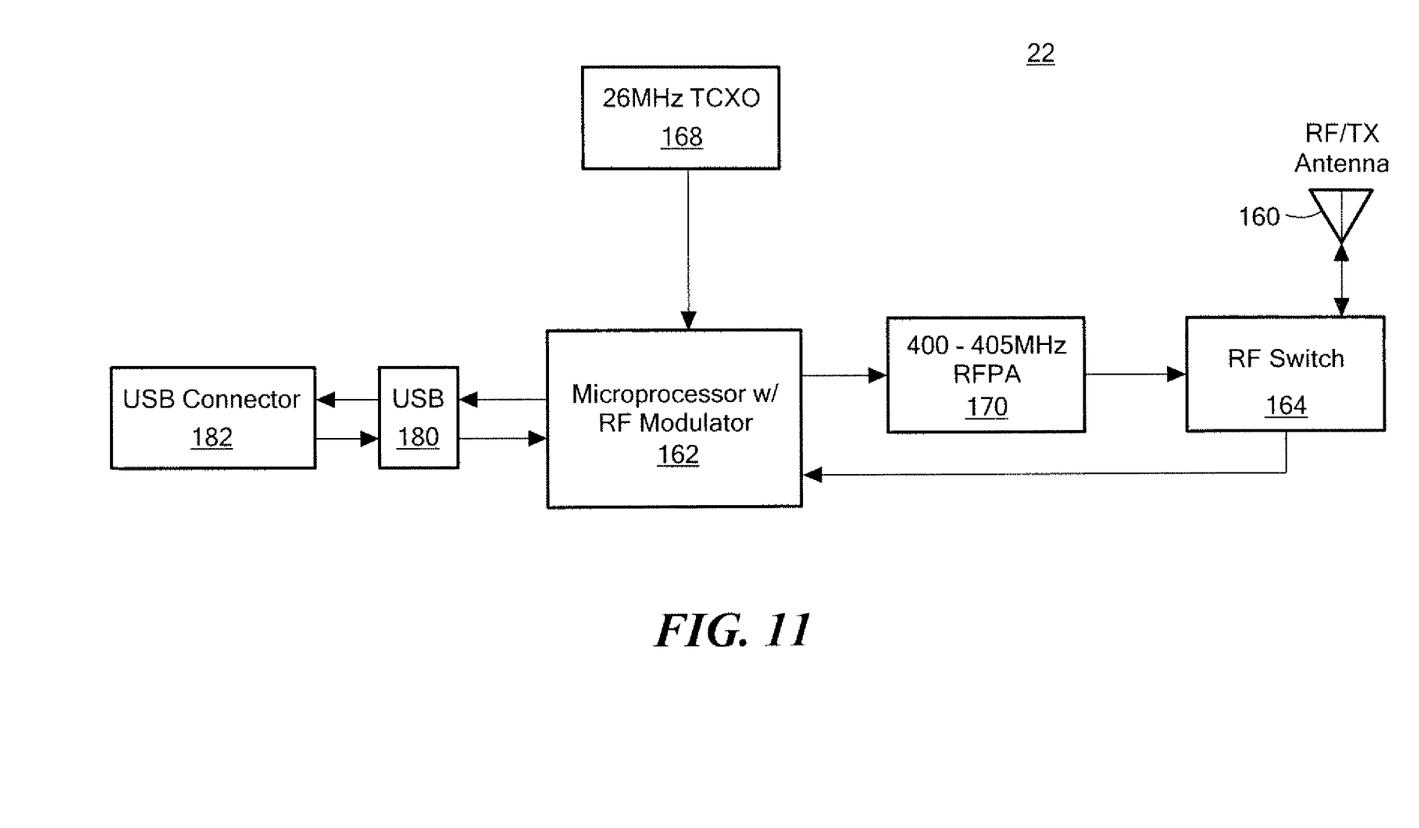
FIG. 11 is a block diagram showing, in one example, the primary components associated with a transceiver in accordance with the invention.

Wearable transceiver 22, FIG. 11 receives data from radiosonde transmitter 140, FIG. 10 via antenna 160, FIG. 11 which is processed in microprocessor 162 equipped with an RF modulator via RF switch 164. Microprocessor 162 receives as an input signals from 26 MHz oscillator 168. Rebroadcasts from transceiver 22 are amplified by 400-405 RF amplifier 170 via RF switch 164 to RX/TX antenna 160. As depicted in FIG. 1, transceiver 22 can be connected to a laptop or other computer via USB interface 180 and USB connector 182.

The result, in one preferred embodiment, is a small, packable, and portable sounding system easily carried, easily deployed, and easy to use in order to provide real time weather data for tactical weather dependent missions such as artillery support, aerial delivery, and the like.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A man packable, portable sounding kit comprising:
   a single, man packable case;
   one or more balloons packaged in the case;
   a radiosonde packaged in the case and attachable to a said balloon via a tether;
   a data transceiver unit packaged in the case and configured to receive atmospheric weather data from the radiosonde and interfaceable, via a USB interface, with a computing device configured to utilize the weather data;
   a gas container packaged in the case for filling the one or more balloons; and
   a fill hose assembly for interconnecting the gas container with a balloon.

2. The sounding kit of claim 1 in which the fill hose assembly includes a balloon inflation nozzle coupled to a pressure regulator.

3. The sounding kit of claim 2 in which the pressure regulator includes a regulator valve.

4. The sounding kit of claim 1 in which the fill hose assembly includes a balloon fill valve adjacent the balloon inflation nozzle.

5. The sounding kit of claim 4 in which the balloon inflation nozzle includes spaced ribs.

6. The sounding kit of claim 1 in which the gas container includes a pressure indicator.

7. The sounding kit of claim 1 in which the components of the kit in total weigh less than 4 kgs.

8. The sounding kit of claim 1 in which there are two balloons.

9. The sounding kit of claim 1 in which the balloon weighs less than 100 grams.

10. The sounding kit of claim 9 in which each balloon is packaged with a radiosonde in a sleeve.

11. The sounding kit of claim 1 in which the gas container has a volume of less than or equal to two liters.

12. The radiosonde kit of claim 1 in which each balloon is packaged with a radiosonde.

13. The sounding kit of claim 1 in which the tether includes a balloon sealer.

14. The sounding kit of claim 1 further including ground station software loadable on the computing device and configured to interpret and display weather data.

\* \* \* \* \*